United States Patent
Zhang et al.

(10) Patent No.: US 8,351,730 B2
(45) Date of Patent: Jan. 8, 2013

(54) SYSTEM AND METHOD FOR SCALING IMAGES

(75) Inventors: Dong-Qing Zhang, Los Angeles, CA (US); Ingo Tobias Doser, Villingen-Schningen (DE); Marco Antonio Vasquez, Los Angeles, CA (US); Xueming Henry Gu, Calabasas, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 335 days.

(21) Appl. No.: 12/678,823

(22) PCT Filed: Sep. 19, 2007

(86) PCT No.: PCT/US2007/020295
§ 371 (c)(1),
(2), (4) Date: Mar. 18, 2010

(87) PCT Pub. No.: WO2009/038559
PCT Pub. Date: Mar. 26, 2009

(65) Prior Publication Data
US 2010/0260433 A1    Oct. 14, 2010

(51) Int. Cl.
*G06K 9/40* (2006.01)
*G06K 9/32* (2006.01)
(52) U.S. Cl. ........................................ 382/264; 382/298
(58) Field of Classification Search ........................ None
See application file for complete search history.

(56) References Cited

U.S. PATENT DOCUMENTS

| | | | |
|---|---|---|---|
| 4,951,144 A | 8/1990 | DesJardins | |
| 5,294,998 A | 3/1994 | Piovoso | |
| 5,343,309 A | 8/1994 | Roetling | |
| 5,446,502 A | 8/1995 | Lebowsky | |
| 5,506,913 A | 4/1996 | Ibison et al. | |
| 5,953,464 A * | 9/1999 | Harrington | 382/299 |
| 6,788,353 B2 * | 9/2004 | Wredenhagen et al. | 348/581 |
| 7,142,729 B2 * | 11/2006 | Wredenhagen et al. | 382/300 |
| 7,149,369 B2 * | 12/2006 | Atkins | 382/299 |
| 7,230,742 B1 * | 6/2007 | Kuwata et al. | 358/3.15 |
| 7,519,235 B1 * | 4/2009 | Georgiev | 382/298 |
| 7,817,871 B2 * | 10/2010 | Chaudhury et al. | 382/266 |
| 7,876,979 B2 * | 1/2011 | Lee et al. | 382/300 |

(Continued)

FOREIGN PATENT DOCUMENTS

EP    0 550 231 A    7/1993

(Continued)

OTHER PUBLICATIONS

Search Report dld Jul. 1, 2008.

*Primary Examiner* — Li Liu
(74) *Attorney, Agent, or Firm* — Robert D. Shedd; Vicent E. Duffy; James McKenzie (57) ABSTRACT

A system and method for scaling images are provided. An upscaling algorithm or function is employed that increases the size of an image and then filters the upscaled image to remove aliasing artifacts. The system and method provides for acquiring an image of a first size, detecting the geometry of the image, scaling the image to a second size, and filtering the scaled image with at least one filter based on the detected geometry. During the filtering process, the edges of objects in the upscaled image are detected and different filter frequency responses are provided for the detected edges. Providing different filter frequency responses for the detected edges preserves more details for line images.

19 Claims, 11 Drawing Sheets

U.S. PATENT DOCUMENTS

| | | |
|---|---|---|
| 2003/0198386 A1 | 10/2003 | Luo |
| 2005/0041871 A1* | 2/2005 | Abe .............................. 382/199 |
| 2006/0115176 A1* | 6/2006 | Kanamori et al. ............ 382/266 |
| 2008/0055338 A1* | 3/2008 | Wei et al. ...................... 345/667 |
| 2008/0112640 A1* | 5/2008 | Park et al. .................... 382/266 |
| 2008/0123998 A1* | 5/2008 | Gomi et al. ................... 382/300 |

FOREIGN PATENT DOCUMENTS

| | | |
|---|---|---|
| EP | 1 054 350 A | 11/2000 |
| EP | 1 748 386 A | 1/2007 |
| EP | 1 816 602 A | 8/2007 |
| JP | HE102294170 | 5/1990 |
| JP | HE105504433 | 7/1993 |
| JP | HE106500220 | 1/1994 |
| JP | HE106225150 | 8/1994 |
| JP | HE106251127 | 9/1994 |
| JP | 9171552 | 6/1997 |
| JP | 2000242774 | 9/2000 |
| JP | 2000253238 | 9/2000 |
| JP | 2001160139 | 6/2001 |
| JP | 2002185795 | 6/2002 |
| JP | 2002319020 | 10/2002 |
| JP | 2003125196 | 4/2003 |
| JP | 2003196651 | 7/2003 |
| JP | 2004207923 | 7/2004 |
| JP | 2005182199 | 7/2005 |
| JP | 2005523530 | 8/2005 |
| JP | 2006 251850 A | 9/2006 |
| JP | 2006252108 | 9/2006 |
| JP | 2007034723 | 2/2007 |
| JP | 2007140684 | 7/2007 |
| WO | WO2006022729 | 3/2006 |
| WO | WO2007054931 | 5/2007 |

* cited by examiner

SYSTEM AND METHOD FOR SCALING IMAGES

This application claims the benefit under 35 U.S.C. §365 of International Application PCT/US2007/020295, filed Sep. 19, 2007, which was published in accordance with PCT article 21(2) on Mar. 26, 2009, in English.

BACKGROUND OF THE INVENTION

Upscaling, a.k.a. upconversion, enlarges the resolution of an image by increasing the number of vertical and horizontal scanline lines. Upscaling is an important problem for many post-production applications. For example, many of the previous TV shows and movies are in SD (Standard Definition) format. In order to play the SD movies in today's HD (High Definition) displays or TVs, it is desirable to convert the SD movies to HD format, which has larger resolution than the SD format. Another exemplary application for upscaling is for display controllers, which need an upscaling component to convert the input image size to the native resolution of the display.

During the upscaling process, because the size of the resulting image is larger than that of the original one, additional pixels have to be inserted into the image, resulting in potential visible artifacts. Traditionally, filters are applied before upscaling to remove the artifacts resulting from pixel insertion. However, in many conventional upscaling algorithms, filters are uniformly applied across the image plane regardless of the local image content such as edges, resulting in blur of details.

Therefore, a need exists for techniques for scaling images without producing unwanted artifacts. Furthermore, a need exists for techniques for upscaling images without loss of quality of the images.

SUMMARY

A system and method for scaling images are provided. An upscaling algorithm or function is employed that increases the size of an image and then filters the upscaled image to remove aliasing artifacts. During the filtering process the edges of objects in the upscaled image are detected and different filter frequency responses are provided for the detected edges. Providing different filter frequency responses for the detected edges preserves more details for line images. The system and method of the present disclosure utilizes an adaptive upscaling algorithm or function which increases the size of an image by inserting additional pixels into the image and preserves the image details according to the local geometry, i.e., the detected edges.

According to one aspect of the present disclosure, a method for scaling an image is provided, the method including acquiring an image of a first size, detecting the geometry of the image, scaling the image to a second size, and filtering the scaled image with at least one filter based on the detected geometry.

In one aspect, the detecting step includes detecting edges of objects in the image. In another aspect, the detecting step further includes generating a first edge map including an edge magnitude for each pixel in the image, and generating a second edge map including an edge direction for each pixel in the image.

In a further aspect, the method further includes generating a plurality of filters, each of the plurality of filters having a different direction, wherein the filtering step includes selecting for each pixel at least one filter having substantially the same edge direction as the edge direction of the pixel. The generating a plurality of filters includes generating a one-dimensional horizontal filter with a first cut-off frequency, generating a one-dimensional vertical filter with a second cut-off frequency less than the first frequency, performing an outer product function on the horizontal and vertical filter to generate a two-dimensional filter, and rotating the two-dimensional filter into a plurality of different directions and storing at least one filter for each of the plurality of different directions.

According to another aspect of the present disclosure, a system for scaling an image of a first size is provided. The system includes a geometry detector configured for detecting the geometry of the image, a scaler module configured for scaling the image to a second size, and a sampling module configured for filtering the scaled image with at least one filter based on the detected geometry.

In a further aspect of the present disclosure, a program storage device readable by a machine, tangibly embodying a program of instructions executable by the machine to perform method steps for scaling an image is provided, the method including acquiring an image of a first size, detecting the geometry of the image, scaling the image to a second size, and filtering the scaled image with at least one filter based on the detected geometry.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views:

FIG. 2 illustrates several resultant images that have been scaled and filtered wherein

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

A system and method for scaling images are provided. An upscaling algorithm or function is employed that increases the size of an image and then filters the upscaled image to remove aliasing artifacts. During the filtering process the edges of objects in the upscaled image are detected, e.g., geometry detection, and different filter frequency responses are provided for the detected edges. The presented upscaling algorithm or function is an extension of the traditional multi-rate 2D signal processing based resizing algorithm, which is optimal in the sense of signal preservation in frequency domain. As a result, as long as the geometry detection is accurate, the performance in terms of quality of the upscaling algorithm or function of the present disclosure will be better than those of the previous algorithms based on the standard multi-rate signal processing alone.

Below, a conventional scaling algorithm or function based on multi-rate signal processing theory will be described and then a system and method employing an enhanced upscaling algorithm or function based on the multi-rate signal processing principle in accordance with the present disclosure will be described.

In image scaling based on multi-rate signal processing, the size change of an image is realized by removing or inserting pixels into the image. As a result, it is inevitable to lose information during the resizing process. The principle of the scaling algorithm or function design is to preserve the image signal as much as possible and avoid the introduction of extra signals that do not belong to the original image. It is more convenient to work in frequency domain rather than spatial domain. In frequency domain, the principle is to preserve the frequency component of the original image, and avoid the introduction of extra frequency components. The principle is the fundamental of the multi-rate signal processing theory, which concerns about the sampling rate change of signals.

Figure 1:
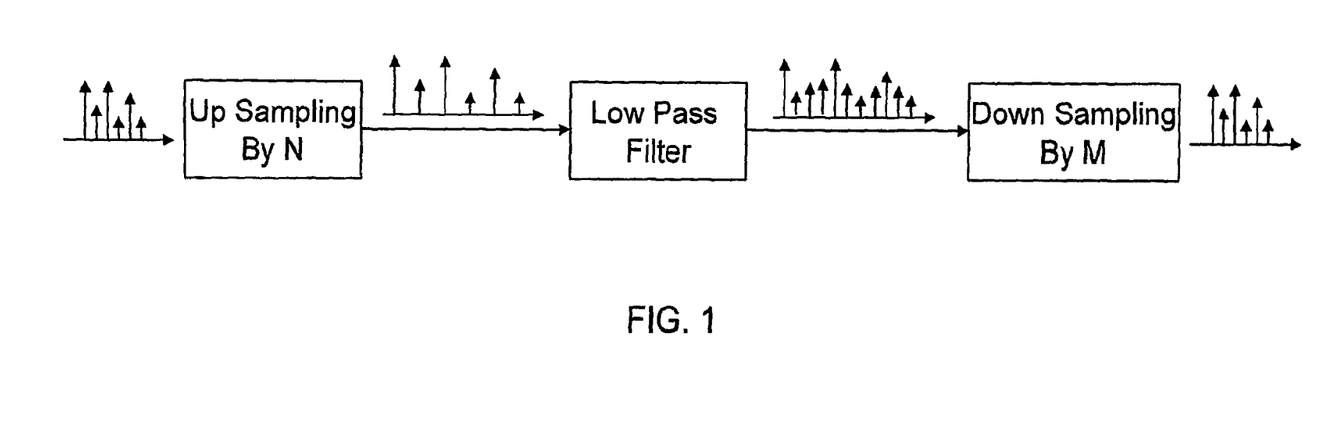
FIG. 1 is an illustration of a general system for standard image scaling.

More specifically, a general image scaler follows the three steps illustrated in FIG. 1: upsampling, filtering and downsampling. For different scaling ratios, the workflow could have slight variations. For example, if the scaling is an upscaling, then the three-step process is reduced to a two-step process consisting of only upsampling and filtering. If the scaling is fractional scaling, then both upsampling and downsampling have to be present. In this disclosure, upsampling means inserting pixels with zero intensity into the image to generate an image with a larger size (one dimensional example is illustrated in FIG. 1) and downsampling means discarding the pixels in the image to generate an image with a smaller size. Filtering is used to avoid aliasing artifacts resulted from resampling, and it is theoretically optimal to be an ideal low-pass filter.

According to the multi-rate signal processing theory, if the scaling ratio is N/M, where N and M is co-prime, then the optimal cut-off frequency of the ideal low-pass filter should be $\pi/\max(M,N)$. N/M defines a unique scaling ratio, for example 1/2 means downscaling by 2; a 2/1 ratio means upscaling by 2.

Figure 2A:
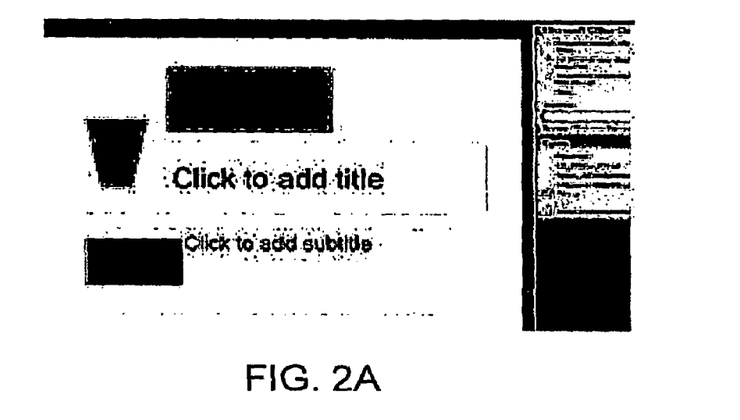
FIG. 2A is a resultant image filtered with an optimal cut-off frequency.
Figure 2B:
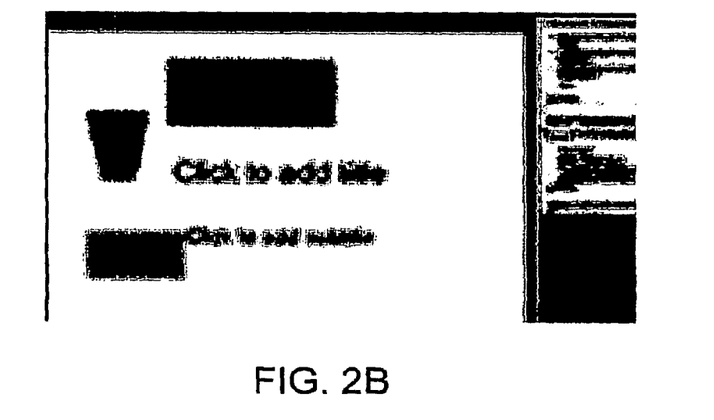
FIG. 2B is a resultant image filtered with a cut-off frequency less than the optimal cut-off frequency and FIG. 2C is a resultant image filtered with the cut-off frequency greater than the optimal cut-off frequency.
Figure 2C:
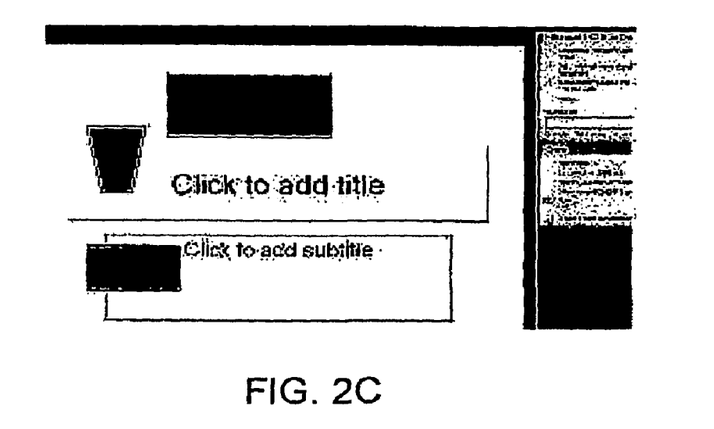

FIG. 2 illustrates several resultant images that have been scaled and filtered wherein FIG. 2A is a resultant image filtered with an optimal cut-off frequency, FIG. 2B is a resultant image filtered with a cut-off frequency less than the optimal cut-off frequency and FIG. 2C is a resultant image filtered with the cut-off frequency greater than the optimal cut-off frequency. As can be seen in FIG. 2B, if the cut-off frequency is smaller than the optimal cut-off frequency, details of the image could be lost, e.g., due to blurring. On the other hand, if the cut-off frequency of the scaling filter is larger than the optimal cut-off frequency, then aliasing artifacts could be visible.

Figure 3:
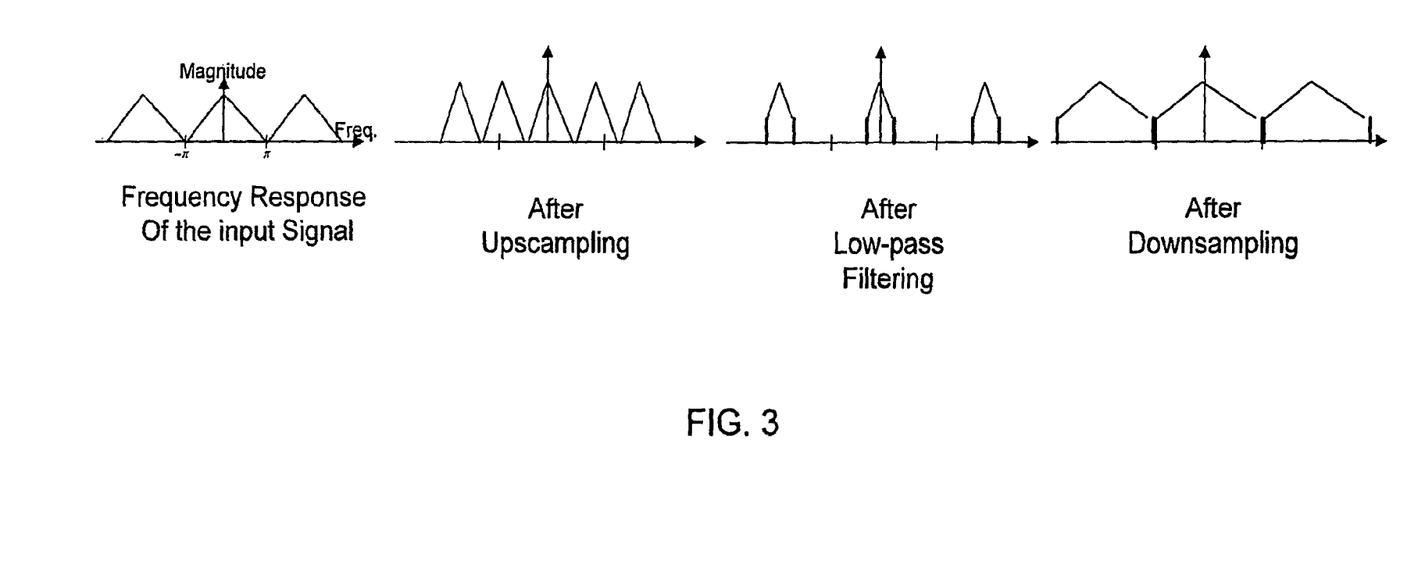
FIG. 3 illustrates the signal frequency response change during image scaling.

The change of frequency response along the processing chain for the standard scaling system is illustrated in FIG. 3 in 1-D, i.e., one dimension. Filtering can be performed either in the frequency domain or spatial domain. The problem of performing filtering in the frequency domain is its high computational complexity and inability to adapt the filter. Therefore, the standard way of performing scaling filtering is to transform the ideal low-pass filter in the frequency domain into spatial filter kernels and apply spatial filtering. The spatial kernel of the ideal low pass filter is a Sync function (e.g., $\sin(x)/x$). Since the Sync function has infinite support, a windowing function has to be applied to make the filter have a finite size. A windowing function is a standard technique used in filter design. Digital filters include FIR filters and IIR filters. The former one has finite taps, the latter one often has infinite taps. In order to implement IIR filters in a computer, the infinite filter size needs to be change into a finite filter size. Windowing function truncates and weights the coefficients of the infinite filters into finite filters.

Figure 4:
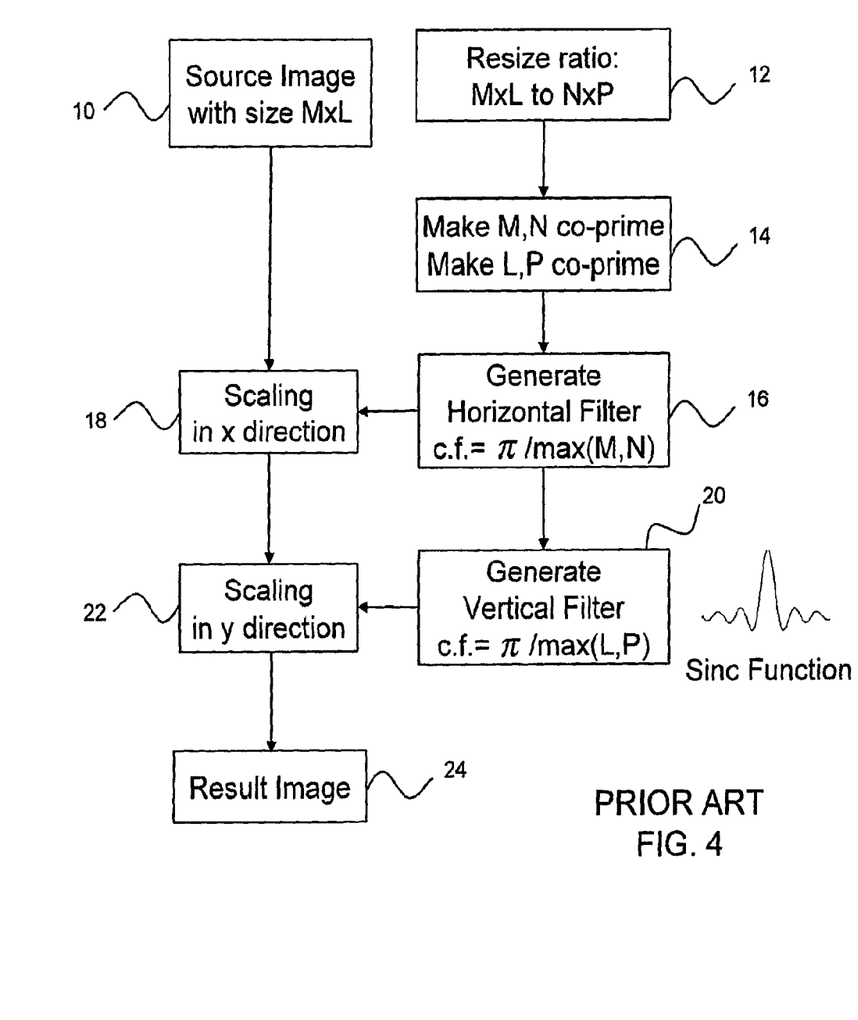
FIG. 4 is a flow diagram of a conventional method for image scaling.

The scaling algorithm or function employed by the conventional scaling system is illustrated in FIG. 4. Initially, in step 10, a source image is obtained with a size M×L. In step 12, a size, e.g., N×P, is selected for the original image to be scaled to. Next, at step 14, M and N are made co-prime to each other and L and P are made co-prime to each other.

In step 16, a horizontal filter is generated with a cut-off frequency equal to $\pi/\max(M,N)$. Scaling is performed in the x direction, i.e., the horizontal direction, at step 18, and the horizontal filter is applied. Next, in step 20, a vertical filter is generated with a cut-off frequency equal to $\pi/\max(L,P)$. Scaling is performed in the y direction, i.e., the vertical direction, at step 22, and the vertical filter is applied. The output for each filter at each pixel is then stored at each pixel location to produce a result image in step 24.

Figure 5A:
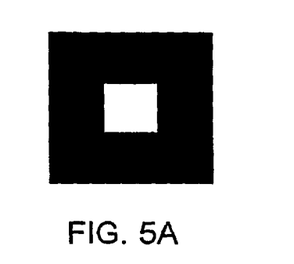
FIG. 5 illustrates two-dimensional (2D) frequency response for scaling filters.
Figure 5B:
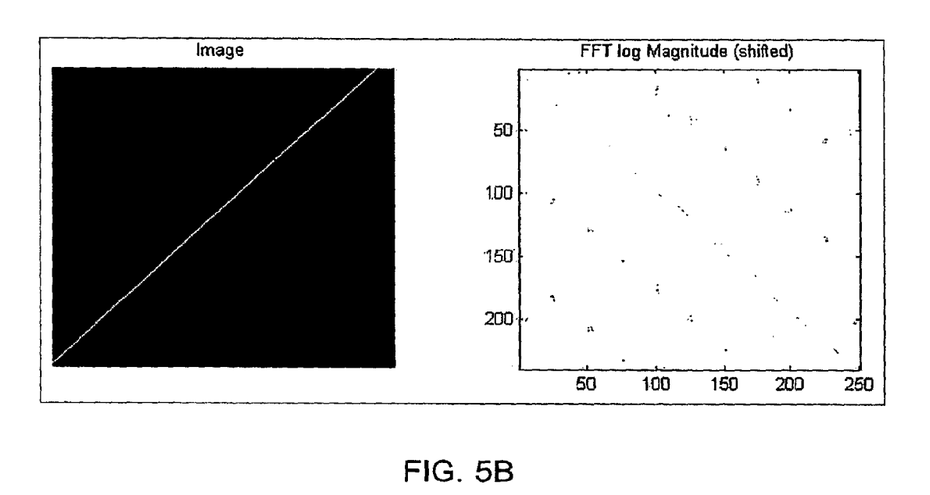
Figure 5C:
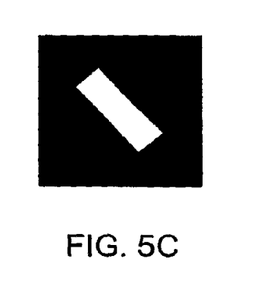
Figure 6A:
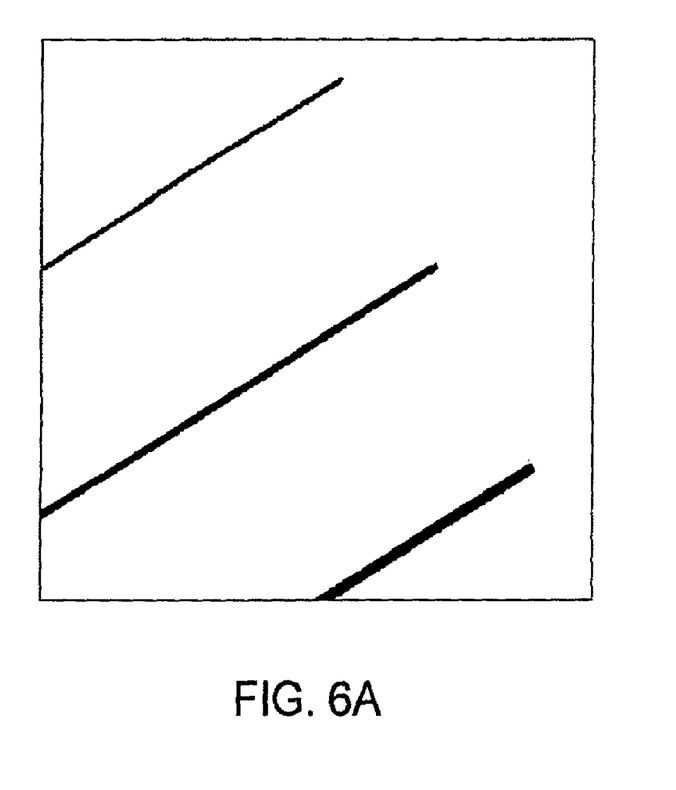
FIG. 6A illustrates a resultant image processed by a standard scaling filter and FIG. 6B illustrates a resultant image processed by a rotated scaling filter in accordance with the present disclosure.
Figure 6B:
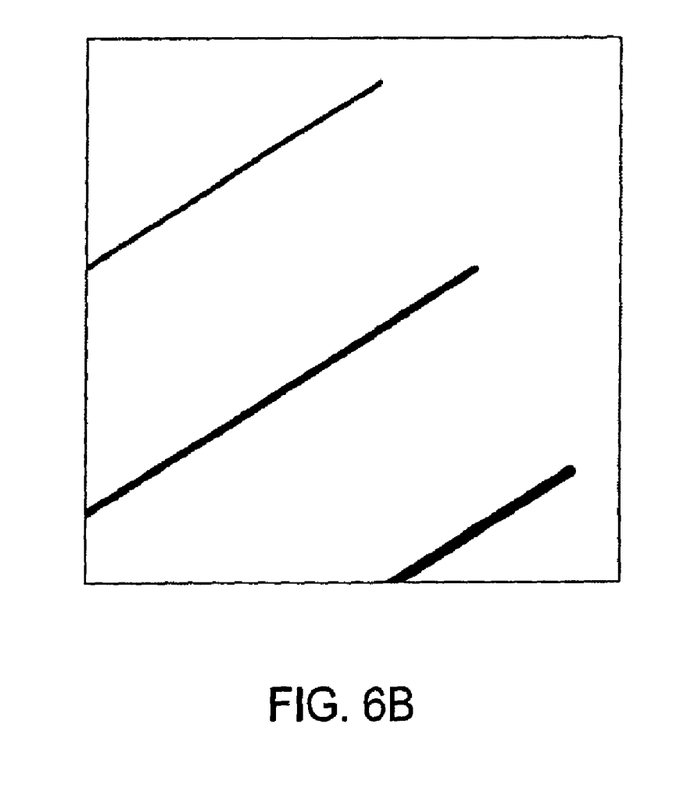

In the conventional scaling algorithm of FIG. 4, since filtering is conducted separately along horizontal and vertical directions, the 2D frequency response of the combined filtering effect is a rectangle in the 2D frequency space, as illustrated in FIG. 5A. However, objects in an image could have different geometry, therefore different local frequency responses. For example, the frequency response of a line is a line in the 2D frequency space (See FIG. 5B where the left portion is an image of a line and the right portion is the frequency response). It can be observed that the frequency response of the line is very concentrated along the antidiagonal line in the 2D frequency space. Therefore, for the line image, a better filter is a filter with rotated frequency response as shown in FIG. 5C, e.g., a perpendicular response, rather than the rectangle response. To generate the perpendicular filter response, the filter is to be rotated in the same direction as the edge or line. The 2D filter with rotated frequency response preserves more details for line images, and is better to remove aliasing component. An example result image produced by using the filter with rotated frequency response is illustrated in FIG. 6, where FIG. 6A illustrates a resultant image processed by a conventional scaling filter and FIG. 6B illustrates a resultant image processed by a rotated scaling filter.

The system and method of the present disclosure employs an adaptive upscaling algorithm or function that adapts the filter frequency response to the local geometry of the image content, and therefore, preserves more details and is more effective to remove aliasing components. For example, if the local geometry is a line or edge, then the filter should be rotated to have the same direction as the edge, or to be parallel to the edge, which will result in an elongated frequency response (e.g., a Fourier transform magnitude) perpendicular to the edge direction. The orientation of the filter frequency response is to be perpendicular to an edge direction, so that the filter bandwidth is lower along the edge direction.

Figure 7:
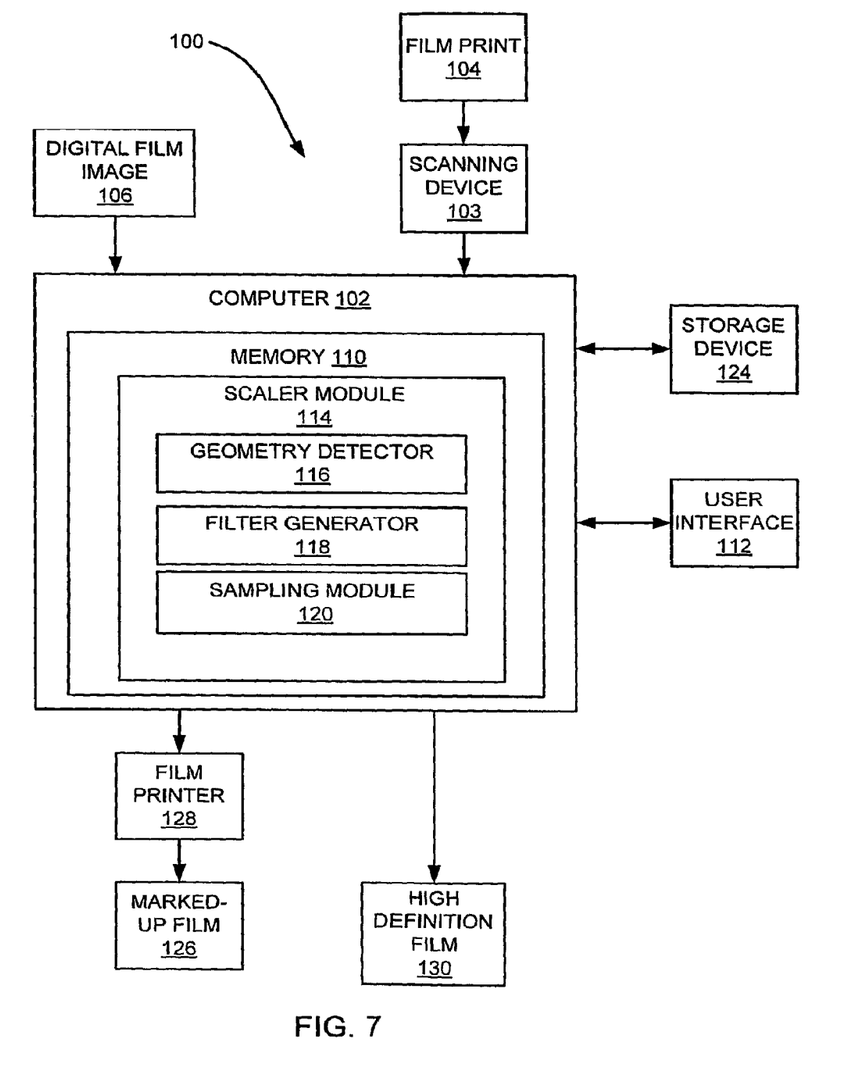
FIG. 7 is an exemplary system for scaling of images in accordance with the present disclosure.

Returning now to the Figures, exemplary system components according to an embodiment of the present disclosure are shown in FIG. 7. A scanning device or apparatus 103 may be provided for scanning film prints 104, e.g., camera-original film negatives, into a digital format, e.g. Cineon-format or Society of Motion Picture and Television Engineers (SMPTE) Digital Picture Exchange (DPX) files. The scanning device 103 may comprise, e.g., a telecine or any device that will generate a video output from film such as, e.g., an Arri LocPro™ with video output. Alternatively, files from the post production process or digital cinema 106 (e.g., files already in computer-readable form) can be used directly. Potential sources of computer-readable files are AVID™ editors, DPX files, D5 tapes etc.

Scanned film prints are input to a post-processing apparatus 102, e.g., a computer. The computer is implemented on any of the various known computer platforms having hardware such as one or more central processing units (CPU), memory 110 such as random access memory (RAM) and/or read only memory (ROM) and input/output (I/O) user interface(s) 112 such as a keyboard, cursor control device (e.g., a mouse, joystick, etc.) and display device. The computer platform also includes an operating system and micro instruction code. The various processes and functions described herein may either be part of the micro instruction code or part of a software application program (or a combination thereof) which is executed via the operating system. In one embodiment, the software application program is tangibly embodied on a program storage device, which may be uploaded to and executed by any suitable machine such as post-processing apparatus 102. In addition, various other peripheral devices may be connected to the computer platform by various interfaces and bus structures, such a parallel port, serial port or universal serial bus (USB). Other peripheral devices may include additional storage devices 124 and a printer 128. The printer 128 may be employed for printing a revised or marked-up version of the film 126, e.g., a HD version of the film.

Alternatively, files/film prints already in computer-readable form 106 (e.g., digital cinema, which for example, may be stored on external hard drive 124) may be directly input into the computer 102. Note that the term "film" used herein may refer to either film prints or digital cinema.

A software program includes a scaler module 114 stored in the memory 110 for scaling images. The scaler module 114 is configured for scaling the image from a first size (M×L) to a second size (N×P). The scaler module 114 includes a geometry detector 116 for detecting the geometry of objects in the image. In one embodiment, the geometry detector 116 may be configured as an edge detector. The edge detector will generate two edge maps for each image: a magnitude map and an orientation map. Each map will contain information for each pixel of the original image.

A filter generator 118 is provided to generate a plurality of filters, each of the plurality of filters having a different direction. The scaler module 114 also includes a sampling module 120 configured for filtering the scaled image with at least one filter based on the detected geometry.

Figure 8:
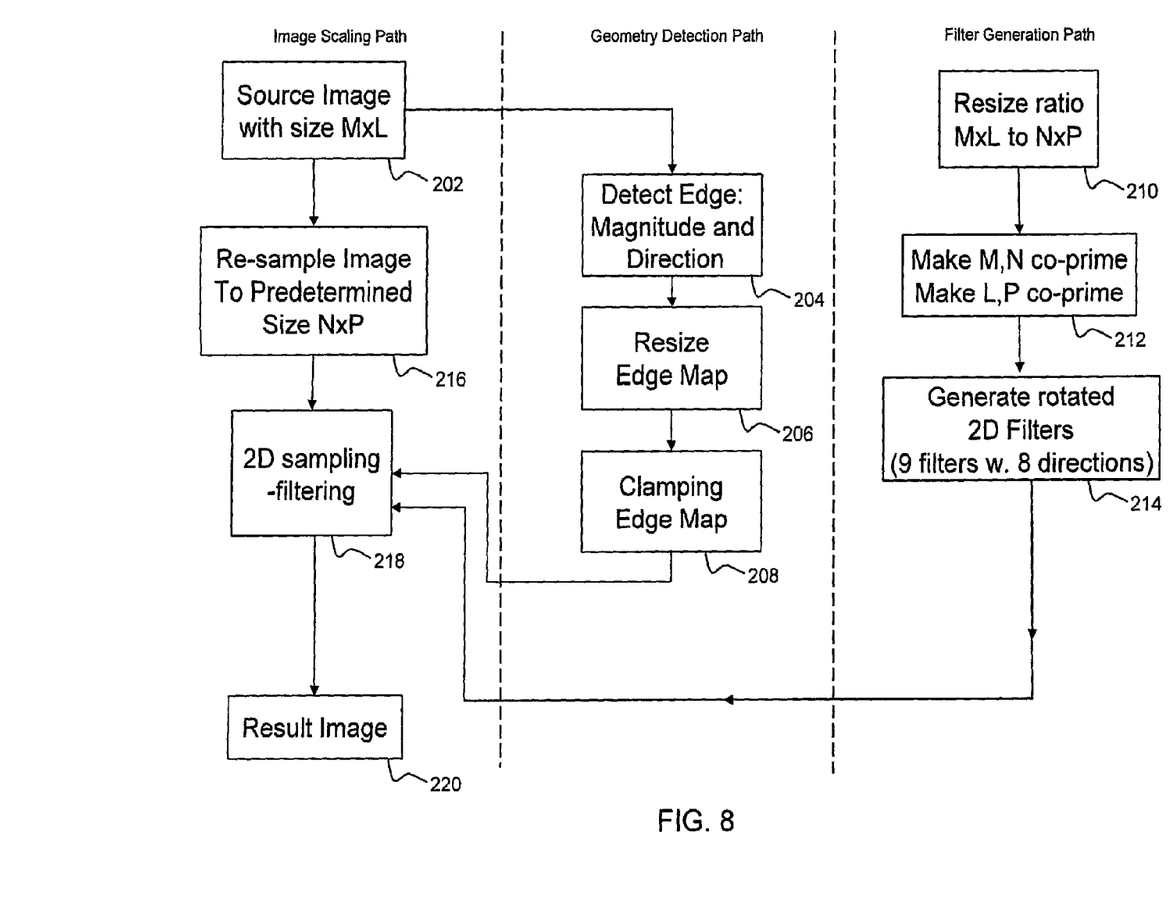
FIG. 8 is a flow diagram of an exemplary method for scaling images according to an aspect of the present disclosure.

FIG. 8 is a flow diagram of an exemplary method for scaling images according to an aspect of the present disclosure. Initially, the post-processing apparatus 102 acquires at least one two-dimensional (2D) image with a size of M×L at step 202. The post-processing apparatus 102 acquires at least one 2D image by obtaining the digital master video file in a computer-readable format, as described above. The digital video file may be acquired by capturing a temporal sequence of video images with a digital video camera. Alternatively, the video sequence may be captured by a conventional film-type camera. In this scenario, the film is scanned via scanning device 103.

It is to be appreciated that whether the film is scanned or already in digital format, the digital file of the film will include indications or information on locations of the frames, e.g., a frame number, time from start of the film, etc. Each frame of the digital video file will include one image, e.g., $I_1$, $I_2$, ... $I_n$.

Once the image or images have been acquired, there are three paths of processing: Geometry Detection Path, Filter Generation Path and Image Scaling Path. Geometry detection and filter generation are conducted before the sampling and filtering processes of the image scaling path as will be described below.

In the geometry detection path, an edge detection function, e.g., a canny edge detection function, is applied by the geometry detector 116 to detect the edges in the image at step 204. An edge map is generated for the image including magnitude and orientation information for each pixel in the image. Two edge maps, i.e. two grayscale images, are generated for each image: a magnitude map and a direction map. For upscaling, at step 206, the edge maps have to be enlarged to the size identical to the size of the resulting image. The edge map resizing can be realized by any conventional image resizer. In step 208, the edge map is clamped, that is a threshold is set to the edge magnitude. If the edge magnitude is below the threshold, then the magnitude is set to zero. This is intended to avoid spurious edges if the edge magnitude is small.

The filter generation path is used to generate filters with different directions via filter generator 118. Initially, in step 210, a size, e.g., N×P, is selected for the original image to be scaled to. In step 212, M and N are made co-prime to each other and L and P are made co-prime to each other. M,N,L,P specifies the scaling ratio, which is M/N in horizontal direction and L/P in the vertical direction. In many multimedia applications, the aspect ratio of an image should be preserved during scaling, therefore, typically M=N, and L=P.

Figure 9:
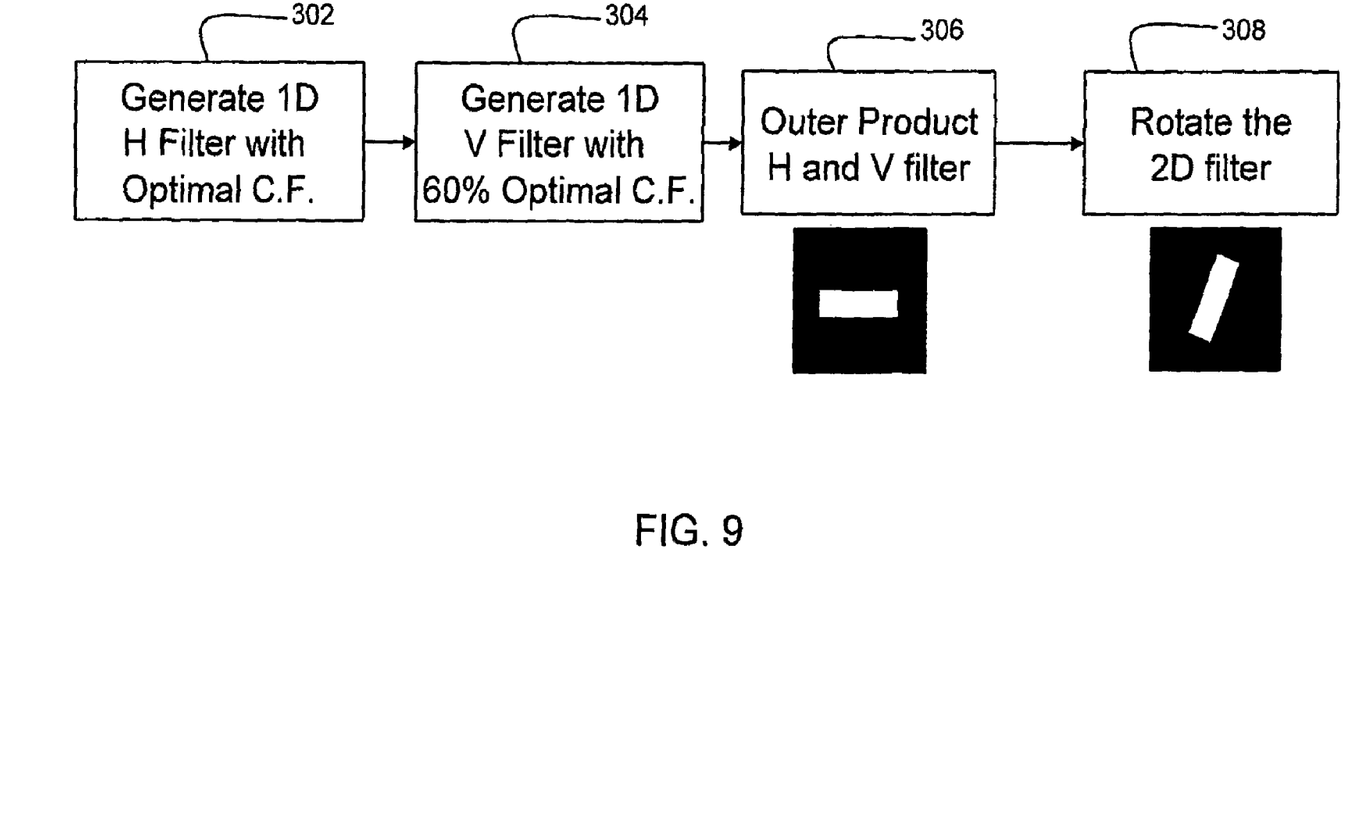
FIG. 9 is a flow diagram of an exemplary method for generating 2D scaling filters according to an aspect of the present disclosure.

In step 214, a bank of 2D filters with different directions is generated. The number of 2D filters is determined empirically. A larger number will result in more computation, however, a smaller number may result in some artifacts. If 8 directions or orientations are used, 9 filters need to be generated. One of the 9 filters is for regular filtering, i.e., an unrotated filter, if no edge is detected. The filter generation procedure is illustrated in FIG. 9. The 2D filter is generated by performing the outer product of two 1D filters (e.g., a horizontal filter and a vertical filter). In step 302, a horizontal filter is generated with an optimal cut-off frequency equal to π/max(M,N), and a vertical filter with 60% of the optimal cut-off frequency is generated in step 304. Assuming M=N, L=P, then the vertical filter will be 60% of π/max(M,N). Then, the outer product (i.e. convolution) of the two filters, i.e., the horizontal filter and vertical filter, is taken to generate a 2D filter at step 306. The final step of filter generation is to rotate the 2D filter to generate a 2D filter with rotated frequency response at step 308. Here, the 2D filter is rotated in eight different directions or orientations to generate the eight filters. Each filter with a different rotated frequency response is then stored to be applied as described below.

Figure 10:
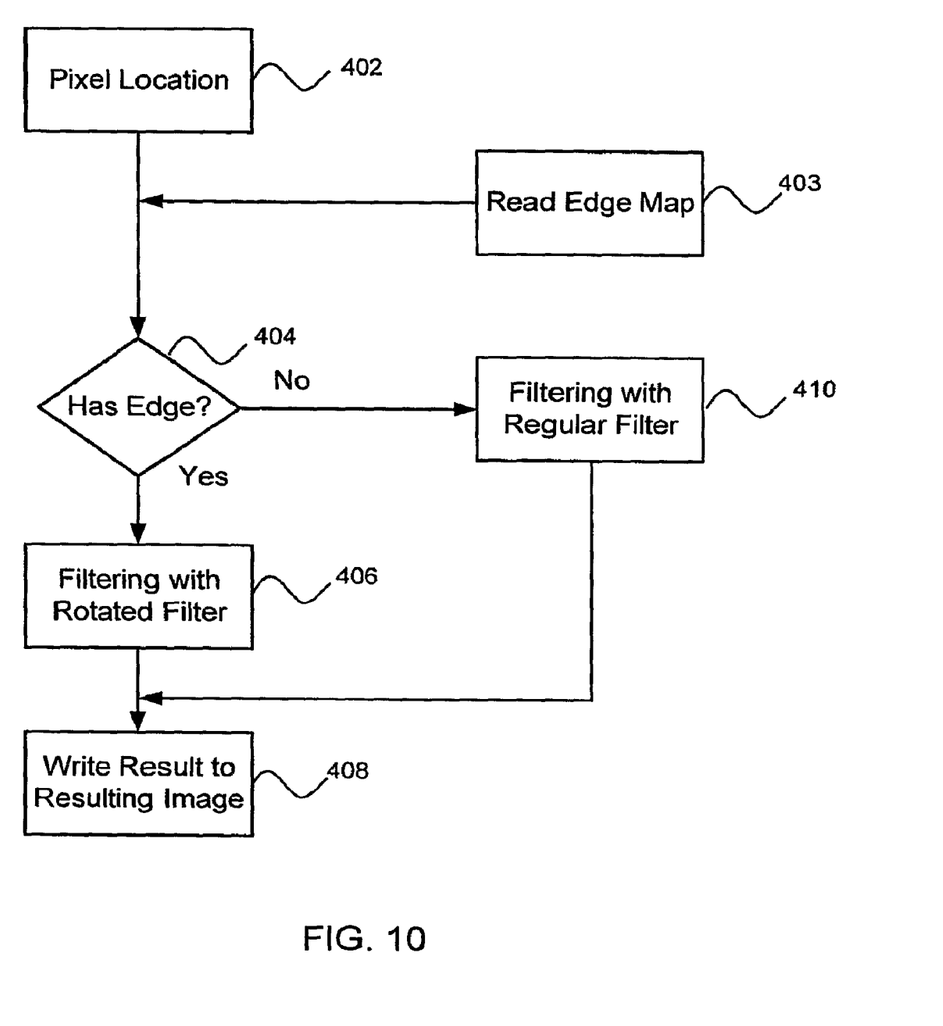
FIG. 10 is a flow diagram of an exemplary method for 2D sampling-filtering of images according to an aspect of the present disclosure.

In the image scaling path, the image is first re-sampled to the specified size at step 216. In the re-sampling step, pixels with zero values (i.e. black color or grayscale) are inserted in the image. Then, in step 218, the generated edge maps are used to sample each pixel of the image and to determine the optimal filtering for each sampled pixel as illustrated in FIG. 10. Edge magnitude is used to determine if a directional filter or regular filter (filters without orientation) should be used, and edge orientation is used to determine which directional filter to use. In step 402, the sampling module 120 determines a pixel location and reads or samples the edge magnitude from the edge map at the pixel location at step 403. If an edge is present at step 404, the filter with the correct orientation will be picked up for 2D filtering at step 406. The chosen filter should have a direction or orientation closest to the orientation or direction of the edge at the pixel. The result of 2D filtering then is written to the resulting image, at step 408. If there is no edge at the pixel at step 404, then 2D filtering using a regular filter (the filter without orientation) is performed at step 410, and the result is written to the resulting image at step 408.

The sampling method will be repeated for each pixel in the image and the results for all the pixels will be stored in a result image at step 220. A plurality of upscaled images may then be stored on storage device 124 as a high definition film 130.

Figure 11A:
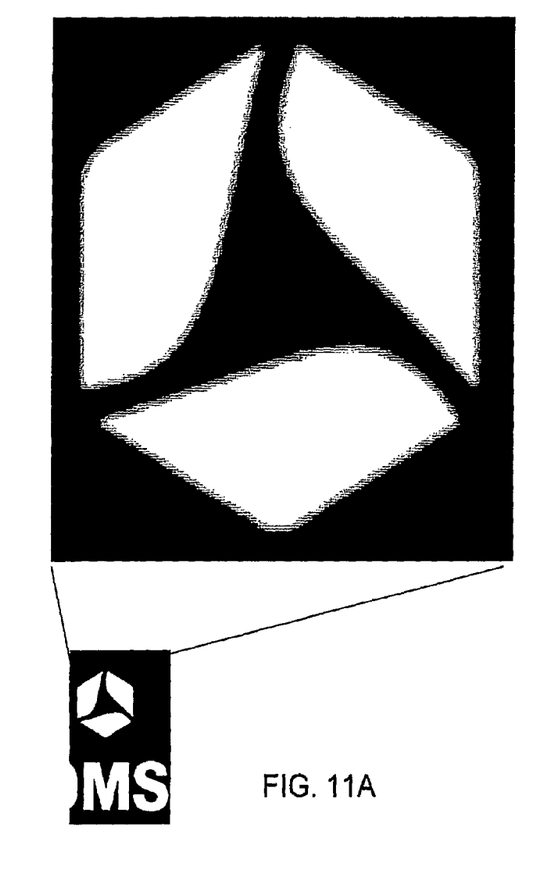
FIG. 11A is a resultant image processed by a conventional scaler and FIG. 11B is a resultant image processed by system and method of the present disclosure.
Figure 11B:
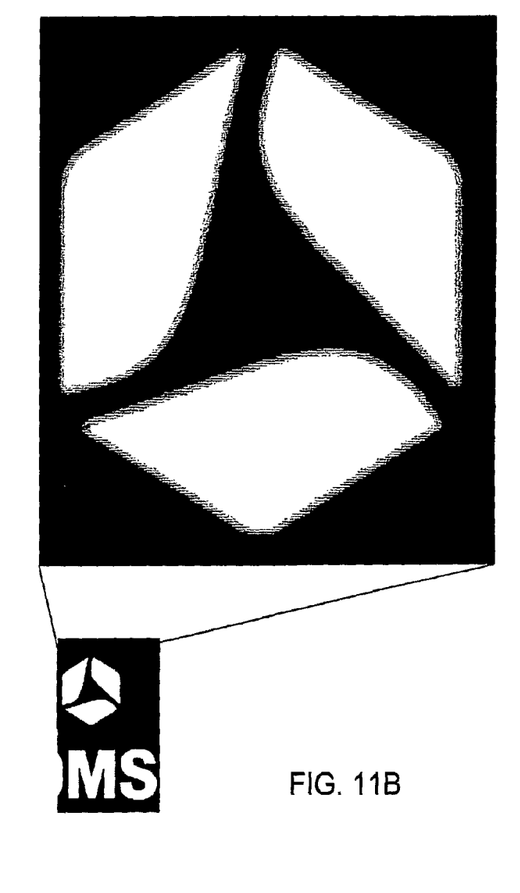

The upscaling algorithm or function of the present disclosure has been implemented in C++, although other programming languages and methods may be employed to implement of the principles of the present disclosure. FIG. 11 shows a result comparison using a conventional scaling filter (FIG. 11A) and using the upscaling filter of the present disclosure (FIG. 11B). As can be seen in FIG. 11B, the image produced from the system and method of the present disclosure results in less zigzag artifacts around the edges of the objects and text. As can be seen in the exploded view of FIG. 11B, the system and method of the present disclosure produces a smoother edge at the black and white border of the objects present in the image.

Although the embodiment which incorporates the teachings of the present disclosure has been shown and described in detail herein, those skilled in the art can readily devise many other varied embodiments that still incorporate these teachings. Having described preferred embodiments for a system and method for scaling images (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method for scaling an image, the method comprising:
acquiring an image of a first size;
detecting a geometry of the image;
scaling the image to a second size;

generating a one-dimensional horizontal filter with a first cut-off frequency;

generating a one-dimensional vertical filter with a second cut-off frequency less than the first cut-off frequency;

performing an outer product function on the horizontal and vertical filter to generate a two-dimensional filter;

rotating the two-dimensional filter into a plurality of different directions and storing at least one filter for each of the plurality of different directions; and filtering the scaled image with at least one of the stored filters based on the detected geometry.

2. The method of claim 1, wherein the detecting step includes detecting edges of objects in the image.

3. The method of claim 1, wherein the detecting step further comprises:

generating a first edge map including an edge magnitude for each pixel in the image; and generating a second edge map including an edge direction for each pixel in the image.

4. The method of claim 3, further comprising:

resizing the first and second edge maps to the second size; and clamping the first edge map, wherein each pixel of the first edge map less than a first threshold is set to a value of zero.

5. The method of claim 4, further comprising generating a plurality of filters, each of the plurality of filters having a different direction, wherein the filtering step includes selecting for each pixel at least one filter having substantially the same edge direction as the edge direction of the pixel.

6. The method of claim 1, wherein the first cut-off frequency is based on a resize ratio of the first size to the second size.

7. The method of claim 1, wherein the second cut-off frequency is about sixty percent of the first cut-off frequency.

8. The method of claim 1, wherein if the edge magnitude of a pixel in the image is less than a second threshold, filtering the pixel with unrotated two-dimensional filter.

9. The method of claim 1, wherein the scaling step includes inserting pixels with zero values into the image.

10. A system for scaling an image of a first size comprising:

a geometry detector configured for detecting a geometry of the image;

a scaler module configured for scaling the image to a second size;

a filter generator configured for generating a one-dimensional horizontal filter with a first cut-off frequency, generating a one-dimensional vertical filter with a second cut-off frequency less than the first cut-off frequency, performing an outer product function on the horizontal and vertical filter to generate a two-dimensional filter and rotating the two-dimensional filter into a plurality of different directions;

a memory for storing at least one filter for each of the plurality of directions; and a sampling module configured for filtering the scaled image with at least one of the stored filters based on the detected geometry.

11. The system of claim 10, wherein the geometry detector is an edge detector configured for detecting edges of objects in the image.

12. The system of claim 10, wherein the geometry detector is an edge detector configured for generating a first edge map including an edge magnitude for each pixel in the image and generating a second edge map including an edge direction for each pixel in the image.

13. The system of claim 12, wherein the scaler module is further configured for resizing the first and second edge maps to the second size; and clamping the first edge map, wherein each pixel of the first edge map less than a first threshold is set to a value of zero.

14. The system of claim 13, wherein the filter generator is further configured for generating a plurality of filters, each of the plurality of filters having a different direction, wherein the sampling module is configured selecting for each pixel at least one filter having substantially the same edge direction as the edge direction of the pixel.

15. The system of claim 10, wherein the first cut-off frequency is based on a resize ratio of the first size to the second size.

16. The system of claim 10, wherein the second cut-off frequency is about sixty percent of the first cut-off frequency.

17. The system of claim 10, wherein if the edge magnitude of a pixel in the image is less than a second threshold, the sampling module is configured to filter the pixel with unrotated two-dimensional filter.

18. The method of claim 10, wherein the scaler module is further configured for inserting pixels with zero values into the image.

19. A program storage device readable by a machine, tangibly embodying a program of instructions executable by the machine to perform method steps for scaling an image, the method comprising:

acquiring an image of a first size;

detecting a geometry of the image;

scaling the image to a second size;

generating a one-dimensional horizontal filter with a first cut-off frequency;

generating a one-dimensional vertical filter with a second cut-off frequency less than the first cut-off frequency;

performing an outer product function on the horizontal and vertical filter to generate a two-dimensional filter;

rotating the two-dimensional filter into a plurality of different directions and storing at least one filter for each of the plurality of different directions; and filtering the scaled image with at least one of the stored filters based on the detected geometry.

* * * * *